United States Patent [19]

Larner

[11] E Re. 29,481

[45] Reissued Nov. 29, 1977

[54] MULTI-WAY DIRECTIONAL FLUID FLOW CONTROL VALVE ARRANGEMENT

[75] Inventor: Donald Alexander Larner, Kingston-upon-Thames, England

[73] Assignee: Fluid Devices, Ltd.

[21] Appl. No.: 649,416

[22] Filed: Jan. 15, 1976

Related U.S. Patent Documents

Reissue of:

[64] Patent No.: 3,760,843
Issued: Sept. 25, 1973
Appl. No.: 222,569
Filed: Feb. 1, 1972

[30] Foreign Application Priority Data

Feb. 1, 1971 United Kingdom ..... 3646/71

[51] Int. Cl.[2] ..... F15B 13/043

[52] U.S. Cl. ..... 137/596.15; 91/454; 137/596.16

[58] Field of Search ..... 137/596.14, 596.15, 137/596.16; 91/454

[56] References Cited

U.S. PATENT DOCUMENTS

| | | | |
|---|---|---|---|
| Re. 26,523 | 2/1969 | Tennis | 137/596.15 X |
| 827,170 | 7/1906 | Murphy | 137/625.69 UX |
| 2,583,185 | 1/1952 | McLeod | 137/596.15 |
| 2,911,005 | 11/1959 | Adelson | 137/596.15 |
| 2,984,257 | 5/1961 | McCormick et al. | 137/596.16 X |
| 3,016,918 | 1/1962 | Wentworth | 137/596.15 |
| 3,080,887 | 3/1963 | Brandenberg | 137/596.14 |
| 3,176,714 | 4/1965 | Smith et al. | 137/596.16 |
| 3,322,148 | 5/1967 | Rochte | 137/596.14 |
| 3,364,822 | 1/1968 | Gutkowski | 137/596.15 X |
| 3,556,144 | 1/1971 | Bickers et al. | 137/596.15 |
| 3,584,647 | 6/1971 | Brown | 137/596.15 |

*Primary Examiner*—Alan Cohan
*Assistant Examiner*—Gerald A. Michalsky

[57] ABSTRACT

In order to provide a multi-way directional fluid flow control valve arrangement which provides good control while being relatively cheap to manufacture, I use simple main valves all of which have parallel axes and all lie in a common plane, enabling me to form the main valves in a cheap manufacturing operation; the pilot valve however is more complex and has at least four connections, but because the pilot valve is smaller, this extra complexity does not make the whole valve arrangement more expensive.

18 Claims, 18 Drawing Figures

FIG. 12a
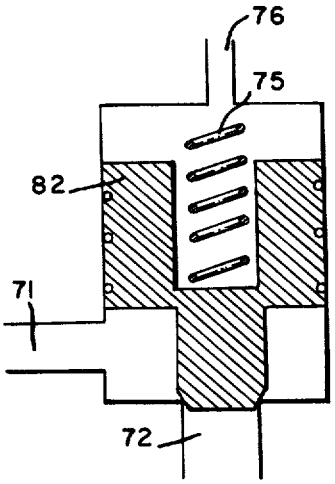
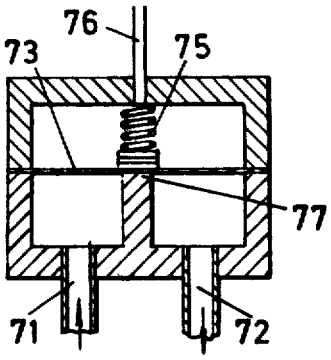
FIG. 9.
FIG. 12b
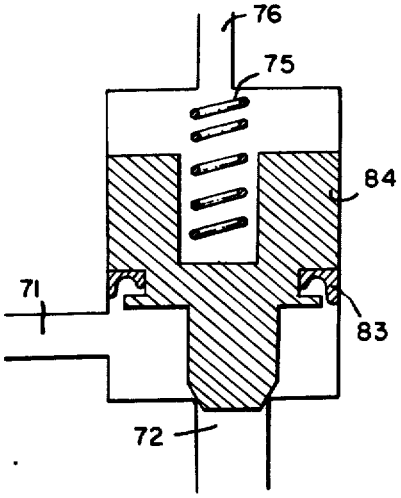
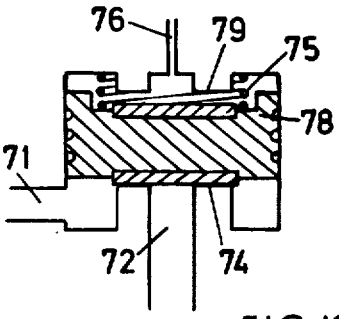
FIG. 10a.
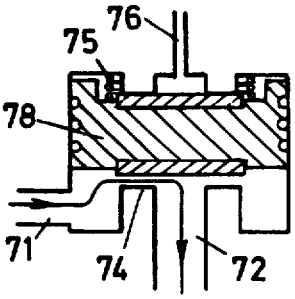
FIG. 10b.
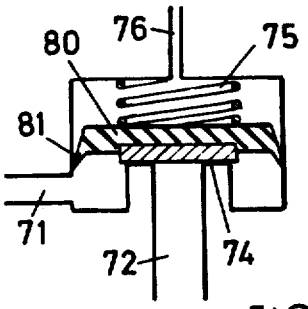
FIG. 11.

MULTI-WAY DIRECTIONAL FLUID FLOW CONTROL VALVE ARRANGEMENT

Matter enclosed in heavy brackets [ ] appears in the original patent but forms no part of this reissue specification; matter printed in italics indicates the additions made by reissue.

This invention relates to a multi-way directional fluid flow control valve arrangement controlled by a pilot valve. Where hereinafter a valve is characterised by the number of connections, the total number of inlet and outlet connections is meant. For instance, if a valve has two inlet connections and four outlet connections, the valve is characterised as a six-connection valve. The directional control valve arrangement is primarily envisaged as a pneumatic valve, but it may be used for controlling for instance hydraulic fluids.

One use of such a directional control valve arrangement is in the control of a double-acting pressure-fluid-operated ram. Each ram chamber in the ram will normally have a respective line connecting it to the valve arrangement, the valve arrangement in turn being connected to a supply line and also to an exhaust line. The valve arrangement may have two positions, each connecting a respective one of the ram chambers to supply and the other ram chamber to exhaust, and the valve arrangement may in addition have a closed centre position. Normally, such a valve arrangement is provided by having a complex main valve, say a spool valve or complex arrangement of mechanically interlinked poppet valves, and a simple pilot valve controlling the position of the main valve.

The present invention provides a multi-way directional fluid flow control valve arrangement including a pilot valve with at least four connections and at least two open/shut main valves each controlled by the pilot valve, the main valves preferably having parallel axes and the main valves preferably all lying in a common plane.

In this manner, the earlier arrangement referred to above is reversed, and the main valve can be simple while the pilot valve and its connections to the main valve are move complex, transferring the complexity to the inherently cheaper, low duty pilot valve. This can be useful for all bore sizes of the main valve, but the advantages become more marked as the bore sizes increase, say for bore sizes of 12.5 mm and upwards. The arrangement can be incorporated in a single compact and simple assembly, for instance because the main valves can have parallel axes and lie in a common plane. Furthermore, with such an arrangement of the main valves, the housing containing the main valves can be made in a simple moulding operation, without any necessity for drilling out ports or ducts after moulding.

The pilot valve can have a very small effective bore size, say 1.5 mm diameter.

The pilot valve is preferably a spool valve, and most preferably is a "hard spool, hard sleeve" spool valve; i.e., a spool valve having no soft seals (such as O-rings); such spool valves can be very sensitive (requiring small forces and displacement for actuation) and be balanced (no bias from pressure of fluid).

The spool valve would include a valve sleeve and an axially movable spool, and the valve sleeve may have bores therethrough extending generally parallel to the axis of the valve sleeve, leading to flow connections on one or both of the axial end faces of the valve sleeve, the valve sleeve also having radial bores leading to valve ports adjacent the spool, an outer sleeve being fitted over the valve sleeve to close the radially outer ends of the radial bores or to connect such radially outer ends to further bores. Stainless steel may be used for both the valve sleeve and the spool, though other materials such as aluminium may be used. The radially outer ends of the bores may lead into channels, for instance annular channels, around the outside of the valve sleeve, and any one radial bore could be supplemented by at least one further radial bore in the same transverse plane, to increase the flow cross-section through the valve.

The valve sleeve need not be of circular cross-section; it could be say of square cross-section, particularly if the valve sleeve is made of aluminium.

The pilot valve has at least four connections, a supply connection, two control connections and an exhaust connection for controlling each of two groups of main valves; the pilot valve could have five or six connections, say with two separate supply connections and/or two separate exhaust connections. The pilot valve is preferably a [two-section] *two-positioned* valve but may have say an additional, centre position closing all main valves.

The control valve arrangement will normally be such that at each end position of the pilot valve, at least one main valve is open and at least one main valve is closed; the pilot valve is preferably such that (e.g., in a spool pilot valve, the relative positioning of the pilot valve sleeve ports and corresponding spool lands is preferably such that) as it moves from one end position to the opposite end position, closing of those main valves which are open is initiated before opening of the remaining main valves is initiated. In the centre portion of its movement therefore, there may be a position of the pilot valve movable member where pilot pressure fluid is applied to all main valves. Such an arrangement can give less leakage, ensure proper control of the system even where pilot movement is relatively slow, and need only require a small differential movement of the pilot valve to induce full reversing action of the control valve arrangement.

The pilot supply connection can be made to the inlet side of the main valve arrangement. Alternatively, or in addition, the pilot exhaust connection can be made to the outlet side of the main valve arrangement, thus disposing of the pilot exhaust without contaminating the working environment (e.g, with oil in pneumatic systems) and permitting quieter operation; however, a minimum pressure drop across these pilot connections is essential to permit correct operation of the main valves by the pilot valve, e.g., to overcome the spring loading and diaphragm stiffness in a spring-biased, diaphragm carried, poppet-type main valve.

Each main valve is preferably a valve having an axially-movable valve member which seats on a valve port at one end of its travel, to close the port, i.e., a diaphragm or poppet-type valve, and can be designed for good sealing and reliable operation for system pressures of up to say 400 atmospheres, pressures at which spool type main valves require very high quality of manufacture or very large overlaps.

The movable member of the main valve may be part of or on a diaphragm sealed to the side wall of the valve chamber or may be part of or on a piston, preferably sealed to the side wall of the valve chamber; to reduce expense, a perfect seal between the piston and the side wall of the valve chamber need not be provided so long as the rear end portion of the piston seals off the corresponding leakage path when the valve is fully open. If a seal is provided, it may be a one-way seal, preventing leakage from the duct being controlled. Spring biasing can be provided, say to urge the movable valve member to a closed position.

The main valve may have other forms; for instance, it may have a seat in the form of a transverse sill separating the inlet and outlet ducts.

The main valves are preferably in a common housing (preferably formed in at least two parts) with suitable communicating ducts formed in the housing. In a preferred embodiment, the pilot valve is also in the housing. An actuator for the pilot valve can be mounted on the housing. In general, where all the main valves are diaphragm valves (have diaphragms) and are in a common housing having at least two parts which are joined generally in a plane normal to the axes of the main valves, a sheet of resilient material may be secured between said parts to provide the diaphragms of the main valves.

If the main valves are diaphragm valves (each of which would have a valve chamber in which there is a movable valve member carried by or formed by the diaphragm and a valve seat), the valve chamber may be substantially longer than it is wide, as seen in section normal to the direction of movement of the valve member (axis of the valve). This is particularly suitable where such main valves are mounted in line, for instance in a single housing. If the shorter dimension of the valve chamber extends along the axis of the line, the line can be substantially shorter. Furthermore, where it is desirable to have communicating ducts running along in the direction of the shorter dimension of the valve chamber, the communicating ducts can be substantially wider and therefore need not be so deep, enabling the height of the valve to be reduced. If the valve housing is moulded, it should be more difficult to mould the housing than to mould a housing having a normal circular valve chamber; the die-sinking may be more expensive, but this does not contribute a large proportion of the cost in a mass production run.

The valve seat can be either generally straight and extend right along the longer dimension of the valve chamber (i.e., in the form of a sill) or can be in the form of a closed loop. In general, the valve chamber is preferably of rectangular shape with semi-circular ends, as seen in section normal to the axis of the valve and the closed loop valve seat is preferably of similar shape. In general, the spacing between the closed loop valve seat and the wall of the valve chamber, as seen in section normal to the axis of the valve, is preferably constant all the way round the valve seat. This has the advantage that the diaphragm acts in effect as two semi-circular diaphragms connected by two linear diaphragms and is not grossly distorted in operation. The valve may have at least one compression spring urging the valve member towards its valve seat, and if the valve member has a rigid backing member or is itself rigid, a single spring can suffice, though in other arrangements, a plurality of symmetrically diposed springs may be used, e.g., two springs co-axial with the semi-circles if the valve sent is in the shape of a rectangle with semi-circular ends.

However, in a preferred embodiment, there are four main valves in a single housing (which however is itself normally of multi-part construction), and the pilot valve is also in the same housing and has its axis parallel to the axes of the main valves, the housing incorporating ducts for the pressure fluid operation of the main valves by the pilot valve; the axes of the main valves are preferably at the corners of a square (as seen in section normal to the axes), the pilot valve having its axis at the intersection of the diagonals of said square — this can provide a particularly compact arrangement. However, it should be noted that the pilot valve could alternatively have its axis in a plane normal to the axes of the main valves, giving the advantage that if the pilot valve is a spool valve, both ends of the spool could be accessible, e.g., for two solenoid actuators to give bi-stable or three position actuation.

Where the movable valve member of the main valve is part of or on a diaphragm, the diaphragm may be arranged to be against or close to a backing surface when the valve is open. As the diaphragm will be subjected to pressure on its areas both inside and outside the valve seat, the backing surface can prevent damage to the diaphragm resulting from such pressure loading and should be as large as possible, preferably extending from the valve member to the zone in which the periphery of the diaphragm is fixed, e.g., being frusto-conical in shape. There is preferably an end stop which stops movement of the valve member just before or as (or even just after with slight local deformation) the diaphragm reaches the backing surface.

If there are four main valves for a double-acting (double chamber) ram, the four main valves being arranged to provide a supply valve and an exhaust valve for each ram chamber, the valve arrangement may have an inlet for connection to a supply of pressure fluid, an exhaust (there may be two exhausts), and a working connection for each ram chamber, the inlet having a check valve for preventing back flow of fluid out of the inlet in the event of supply pressure failure, and consequent loss of control of the pressure operated ram or other fluid actuated device coupled to the working connections.

If the pilot valve has a mid-position in which pilot pressure is applied to all four main valves to close them, the inlet may be connected directly (i.e., not enough the main valves) to each said working connection by way of respective check valves preventing direct flow of fluid from the inlet to said working connections. If the pressure fluid supply fails, the first-mentioned check valve will prevent sudden loss of pressure in the pilot valve and hence sudden opening of the main valve. However, some leakage normally occurs (particularly if the ram is a pneumatic ram) and such leakage could lead to eventual sudden opening if a main valve when the pilot pressure becomes sufficiently less than the pressure in the respective ram chamber for the differential to overcome for instance spring force on the main valve; the further check valves ensure that the pilot pressure can never become less than the pressure in the ram chambers.

The actuator for the pilot valve may be of any suitable type, e.g., manual, mechanical, electrical or fluid pressure operated. If the actuator is not manual, a manual override can be fitted for use for instance in case of power failure or machine setting. The pilot valve may be spring biased into one end position, and it is desirable that the pilot valve is push operated, though a suitable pull-operation arrangement is described in British Pat. specification No. 981,510. The preferred actuator is an electromagnetic actuator, and suitable electromagnetic actuators are known. An electromagnetic moving-armature actuator may have the space in which the armature moves sealed to the pilot valve, and generally to the pilot valve space in which the movable valve member thereof (e.g., a spool) moves. This can considerably reduce sealing problems.

The invention will be further described, by way of example, with reference to the accompanying drawings, of which:

FIG. 9 is a diagram of an alternative form of main control valve;

FIGS. 10a and 10b are diagrams of a second alternative form of main control valve;

FIG. 11 is a diagram of a third alternative form of main control valve;

FIGS. 12a and 12b are a diagram of fourth and fifth alternative forms of main control valve, particularly for hydraulic work;

SCHEMATIC LAYOUT

Figure 1:
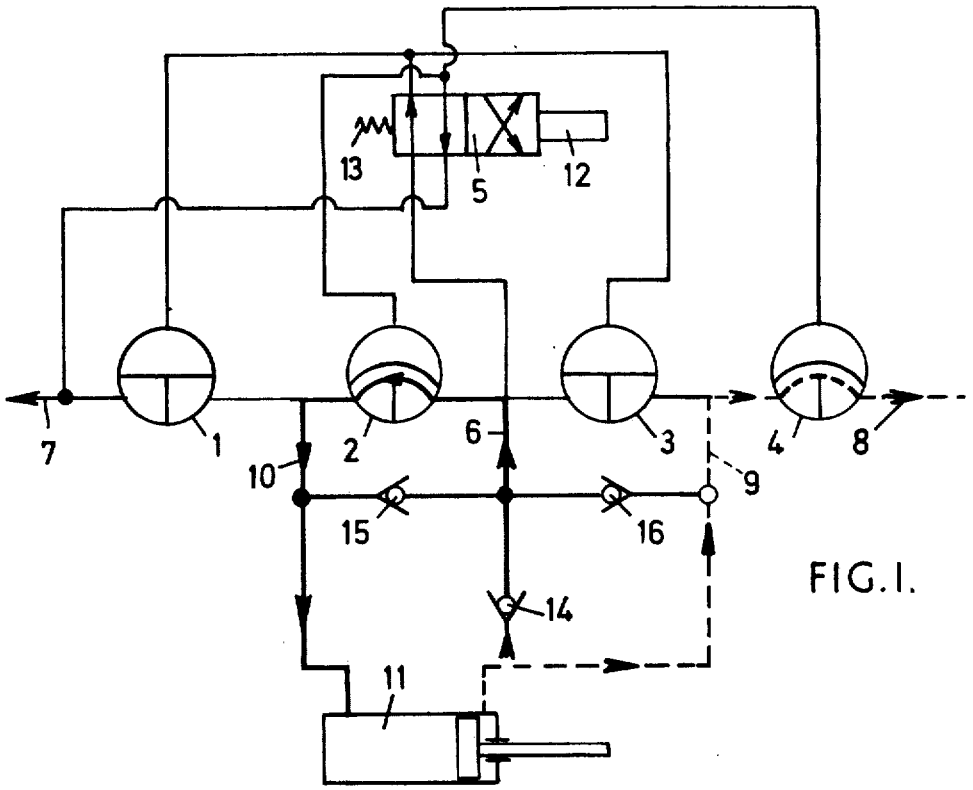
FIG. 1 is a diagram showing a schematic layout incorporating a directional control valve arrangement in accordance with the invention.

The directional control valve arrangement has four main valves 1, 2, 3 and 4 and a pilot valve 5. The valve arrangement has an inlet duct 6, two exhaust ducts 7, 8 (which may be joined to form a single exhaust duct) and two working ducts 9, 10 which are connected to respective ram chambers of a double-acting ram 11. The connections within the valve arrangement are shown in a conventional manner.

The pilot valve 5 has one solenoid 12 acting thereon, and is spring-biased in one direction by a spring 13. Alternatively however (though not shown), the spring 13 could be replaced by a further solenoid, thus affording so-called two-position bi-stable control. Alternatively again (though again not shown), the pilot valve 5 could be spring-centred and have two solenoids, acting on the pilot valve in opposite directions, thus affording so-called three-position control; in the centre position, the pilot valve would apply pressure fluid to all four main valves 1–4, thus locking the ram 11 against movement in either direction. Such an arrangement operates better in a hydraulic system than in a pneumatic system.

To prevent the load from dropping suddenly in the event of a main pressure fluid supply failure, a check valve 14 is installed between the inlet duct 6 and a main supply pipe to stop pressure fluid from refluxing into the main supply pipe. In the three-position closed-centred version of the pilot valve 5, two small capacity check valves 15, 16 may additionally be provided to maintain pilot pressure for as long as the pressure fluid remains in either chamber of the ram 11.

SPECIFIC EMBODIMENT

Figure 2:
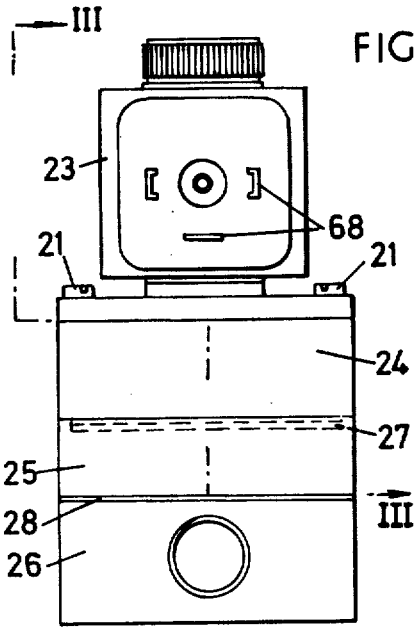
FIG. 2 is an end elevation of a unit incorporating a directional control valve arrangement in accordance with the invention and an electromagnetic actuator therefor.
Figure 8:
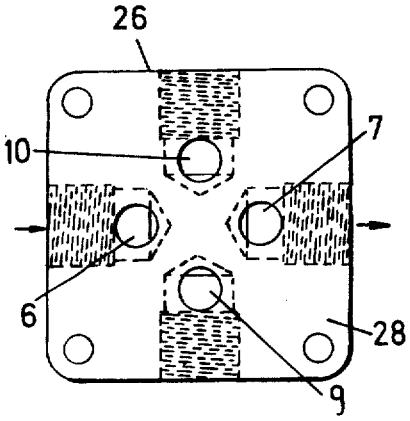
FIG. 8 is a plan view of the sub-plate, with the gasket in position.

The specific embodiment shown in FIGS. 2 to 8 has four main parts, secured together by screws 21 (FIG. 2) passing down through holes 22 (FIG. 4) at the corners of the parts. The main parts are a solenoid actuator 23, an upper valve block 24, a lower valve block 25 and a sub-plate 26 (FIGS. 2 and 8). Gaskets 27, 28 are provided between the upper and lower valve blocks 24, 25 and between the lower valve block 25 and the sub-plate 26, respectively.

THE MAIN STAGE

Figure 5:
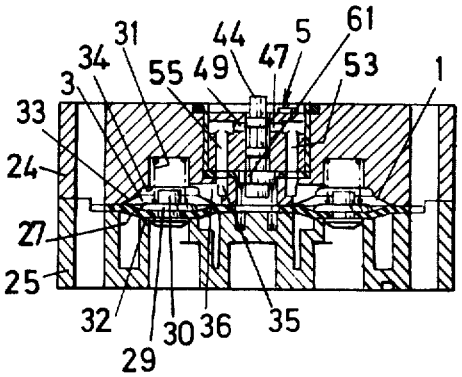
FIG. 5 is a section along the line V—V of FIG. 4 (not showing the sub-plate)
Figure 6:
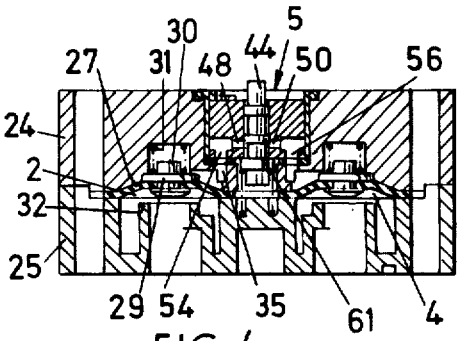
FIG. 6 is a section along the line VI—VI of FIG. 4 (now showing the sub-plate)
Figure 7:
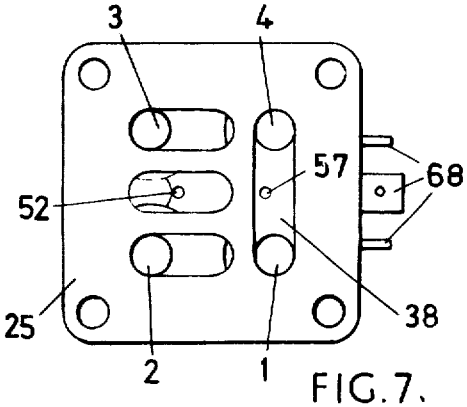
FIG. 7 is an inverse plan view of the unit, with the sub-plate and gasket removed.

The main valves 1–4 are diaphragm valves formed in the valve blocks 24, 25, and the gasket 27 also forms all the diaphragms. The main valves all lie in a common plane normal to their axes of movement. As can be seen in FIGS. 5 and 6, each diaphragm has a supporting washer 29 secured to a headed stud 30 which provides a locating stem around which is a helical bias spring 31. Each main valve has an annular valve seat 32, the preferred direction of flow being from the space around the valve seat to the space within the valve seat; in this manner, the annular zone of the diaphragm around the supporting washer 29 need never be subjected to any sustained substantial downward pressure differential, the pilot pressure on the upper surface of this zone normally being substantially balanced by the pressure below the surface of the zone when the valve is closed. The bias spring 13 can ensure efficient sealing when the valve is closed.

The upper valve block 24 is shaped so that when pilot pressure is removed and the valve opens (and full working pressure acts over the whole area of the diaphragm), said zone of the diaphragm is supported by a frustoconical backing face 33 (FIG. 5) and the supporting washer 29 is supported by a shoulder 34 (FIG. 5). The pilot connections to the main valves 1–4 are formed in the upper valve block 24 by short bores 35 running parallel to the axes of the main valves 1–4 and transverse slots 36 (FIG. 5).

Figure 3:
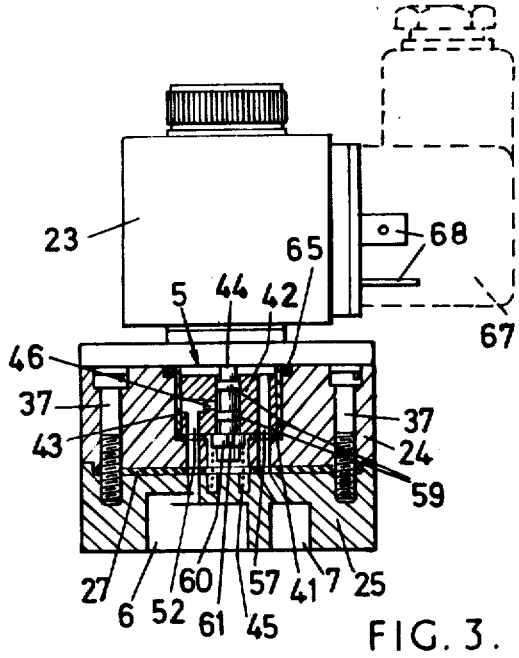
FIG. 3 is a side elevation of the unit of FIG. 1, mainly in section along the line III—III of FIGS. 2 and 4, but with a connecting sub-plate removed, an electrical connector socket being indicated in dashed lines.
Figure 4:
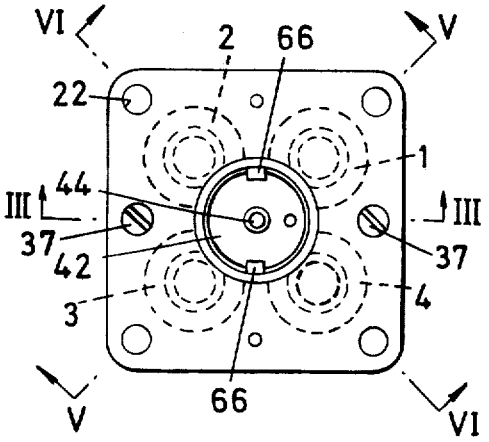
FIG. 4 is a plan view of the valve block of the unit (actuator removed)

The valve blocks 24, 25 are held together for assembly purposes by shorter screws 37 (FIG. 3).

As shown in FIG. 8, the sub-plate 26 has threaded connections leading to the inlet duct 6, exhaust duct 7 and working ducts 9, 10, and the sub-plate 26 has bores in its upper surface corresponding to the holes in the gasket 28. As can be seen from FIG. 7, these holes communicate with slots formed in the bottom of the lower valve block 25, which also form parts of the inlet duct 6, exhaust duct 7 and working ducts 9, 10. A slot 38 interconnects the outlets of the main valves 1, 4, thus enabling there to be a single exhaust duct 7.

THE PILOT VALVE

The pilot valve 5 is inserted in a bore in the centre of the upper valve block 24 and is sealed at its bottom face by means of a gasket 41 (FIG. 3). The pilot valve 5 has a very thick valve sleeve 42 with a tube 43 pressed over its outside diameter; the valve sleeve defines a narrow, smooth sided cylindrical axial bore having no lands, which bore contains a small diameter spool 44 biased into an uppermost position by a helical return spring 45. The spool 44 is pressure-balanced which means that under the static pressure of the fluid, there is no substantial axial force generated on the spool 44 at any position along its working stroke, though, during movement of the spool, slight differential pressure force is generated by pressure drops and so-called "jet" or "Bernouilli" effects do act on the spool for very brief periods as the little control chambers over the main diaphragm or gasket 27 are filled or emptied as the case may be, such forces being small by comparison with direct static pressure forces.

The valve sleeve 42 has several radial drillings 46–50 which are arranged to give radial force balance across the pilot valve and whose radially outer ends are sealed by the tube 43 and which are in communication by way of axial-parallel drillings 52–56 with the inlet duct 6 and (via the short bores 35 and transverse slot 36) the four main valves 1–4, respectively. There is also an axial-parallel exhaust drilling 57 communicating with the end faces of the sleeve and with the common exhaust duct 7. The radial and axial drillings cannot all be seen on any one of the sections, but can all be seen on the sections of FIGS. 3, 5 and 6; as can be seen from FIG. 3, the axial drillings 52, 57 continue on in small passages in the upper and lower valve blocks 24, 25 and their lower ends are visible in FIG. 7.

The pilot valve spool 44 has lands 59 (FIG. 3) whose centres are slightly further apart than the centres of the radial drillings 46–50 so that on movement of the spool 44 from one end position to the opposite end position, the open main valves begin to move into their closed positions before the closed main valves begin to move into their open positions. The lands 59 have approximately the same axial length as the diameter of the radial drillings 46–50; reversal of the main valves thus occurs with a snap action.

The lower end of the spool 44 has a head 60 (FIG. 3) which seats against the bottom of the valve sleeve 42 in the de-energised position (which position is shown in FIGS. 3, 5 and 6). Two square slots 61 are cut through the periphery of the head [46] *60* in order to leave an exhaust passage from the interior of the valve sleeve 42.

THE SOLENOID ACTUATOR

A conventional solenoid actuator 23 can be used, and the actuator is not described in detail. The armature of the actuator acts upon the top end of the pilot valve spool 44; some power reserve should be provided to allow for slight varnishing of the spool 44 after extensive use in pneumatic installations.

The interior of the actuator is pressure tight and sealed to the interior of the pilot valve 5 by means of an O-ring 65 (FIG. 3); this makes the actuator a "wet armature" actuator which eliminates sliding seals in the valve mechanism, whilst still ensuring that all control fluid is fully contained and eventually passed to exhaust through the main exhaust duct 7.

The valve blocks 24, 25 may be secured to the actuator 23 by means of screws (not shown) entering from the lower face of the lower valve block 25. It will be noted that the baseplate of the actuator 23 abuts the top end of the tube 43 to clamp the valve sleeve 42 against its lower sealing gasket 41 with the assistance of bent-in tabs 66 (FIG. 4) formed on the tube 43.

FIG. 3 indicates a form of free multi-point electrical connector 67 which may be used to engage connecting pins 68 on the solenoid actuator 23.

OPERATION

The operation of the unit of FIGS. 2 to 8 need not be described in detail. It is in accordance with the description of the operation of the layout of FIG. 1.

PREFERRED MANUFACTURING METHODS

Both valve blocks 24, 25 may be plastic injection mouldings, using a high rigidity, low water-absorbent material. No subsequent drilling is required, i.e., the valve blocks 24 and 25 may come from the mould fully finished.

The materials for the pilot valve spool 44 and sleeve 42 may be martensitic stainless steel, but substitute materials followed by suitable electro-plating may be feasible in place of martensitic stainless steel; the finished parts should be proof against corrosion from water vapour in the air supply.

The gasket 27 may be in nitrile rubber or flexible plastic, as may be the gaskets 28, 41, with nylon fabric or cotton inserts if necessary.

THE UNIT IN GENERAL

The unit shown in FIGS. 2 to 8 has been designed as a 7 mm bore version, and has a total height of 79 mm (excluding the sub-plate 26); however, the dimensions may be varied to suit different applications. The unit is described as though it was for pneumatic operation; however, it will be appreciated that any suitable fluid (e.g., oil, $N_2$ or $CO_2$) could be used without any modification of the construction, apart from choice of materials.

FUNCTIONAL ADVANTAGES

The use of this composite spool/poppet valve arrangement offers the following advantages:

1. The valve arrangement requires very little operating effort, say not above 0.45 kg., and the actuating movement is say 1.5 mm.
2. The valve arrangement will operate with a precisely defined 'snap action' over a differential spool movement of say 0.2 mm.
3. The response time will be extremely short, due to the short operating movements and low mass of the moving parts.
4. Whilst possessing the inherent consistency and longevity of the spool principle, the valve will display 'bubble tight' control characteristics because of the design of the main stage. Leakage from the pilot stage will be exceedingly small in relation to the capacity of the complete valve arrangement, even with non-selective pairing of spool and sleeve.
5. The overall dimensions are small for the pneumatic capacity and functional refinement of the mechanism.
6. The valve can be basically cheap to manufacture on a continuing basis, after suitable initial capital investment in tooling.
7. There is no adverse 'scale effect'— the principle becomes better with respect to existing alternatives as the bore size is increased.

OTHER ACTUATOR FORMS

Any suitable form of actuator can be employed to move the pilot valve, and may be suitable for the following forms of control:

1. Air pilot operation say over the range 1–10 atmospheres, utilising say a piston-type actuator.
2. Fluidic signal operation, working down to, say, 0.07 atmospheres, utilising say a more sensitive, diaphragm-type actuator.
3. Manual operation by push button, two position switch, etc., possibly utilising actuators similar to and compatible with conventional low tension industrial switchgear.

ALTERNATIVE MAIN VALVE CONSTRUCTIONS

In the alternative forms of main valve shown in FIGS. [9–12,] *9–11*, the valves have an inlet 71, and outlet 72, an annular seat 74 (FIGS. [10/] *10a* & 11), a bias spring 75 and a pilot duct 76.

In FIG. 9, instead of an annular seat, the valve has a transverse sill 77 into which a diaphragm 73 closes.

FIGS. 10a (closed) and 10b (open) show a loosely fitting piston-type valve member 78 with an additional top seat 79 to prevent continuous leakage after the valve has opened. In this way, a perfect seal is obtained even though the valve member 78 is somewhat loose in its bore.

FIG. 11 (closed) shows a valve member 80 with a uni-directional seal in the form of a flexible lip 81 which is applicable to two-position operation. During actuation (downwards movement of the valve member 80) pressure is substantially equalised on either side of the lip 81.

FIGS. 12a and 12b (closed) shows two alternatives. In FIG. 12a, there is a fitting piston 82; In FIG. 12b, there is a flexible lipped seal 83 on a piston 84. The flexible lipped seal 83 would not cause excessive frictional resistance to the movement of the valve element because the pressure differential across it could be quite small when movement is taking place. These alternatives are particularly suitable for high pressure hydraulic applications. The alternatives of FIGS. 12a and 12b could have top seats as in FIGS. 10a and 10b.

The valve of FIGS. 13 to 16 is arranged for control by a four-connection pilot valve which may be generally of the type shown in FIG. 1, but which may not be incorporated in the valve block. For instance, the pilot valve may be mounted on top of the valve block 101 with an actuator mounted on top of the pilot valve.

The valve block 101 forms a single housing for four open/shut main valves 102, and is in two parts 103, 104 sandwiching a single generally rectangular diaphragm 105.

Figure 16:
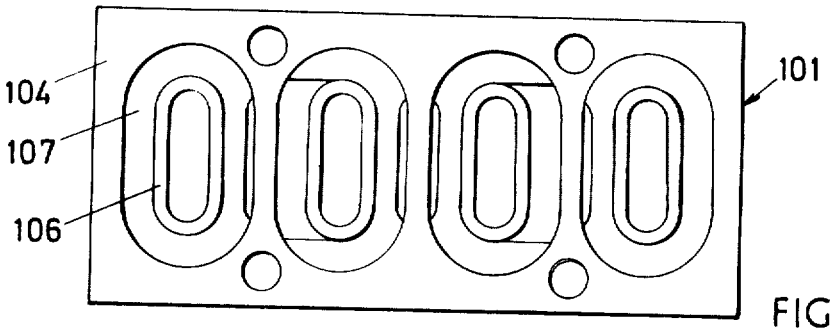
FIG. 16 is a plan view of the lower half of the valve block of FIG. 13.

As can be seen in FIG. 16, each main valve has a loop-shaped valve seat 106 in a valve chamber 107 of a similar shape, the shape being that of a rectangle with semi-circular ends. In this manner, the "length" of the valve chamber is substantially greater than the "width."

There are two tapped connections 108 (see FIGS. 13 and 14) for connection to the controlling pilot valve, the tapped connection 108 communicating with the main valve by way of suitable ducts 109 in the upper part 103 of the housing.

Figure 13:
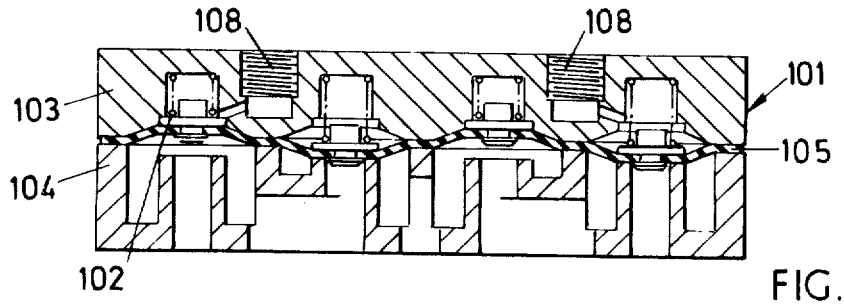
FIG. 13 is a side elevation, mainly in section along the line XIII—XIII of FIG. 14, of a modified valve block of a directional control valve in accordance with the invention.
Figure 14:
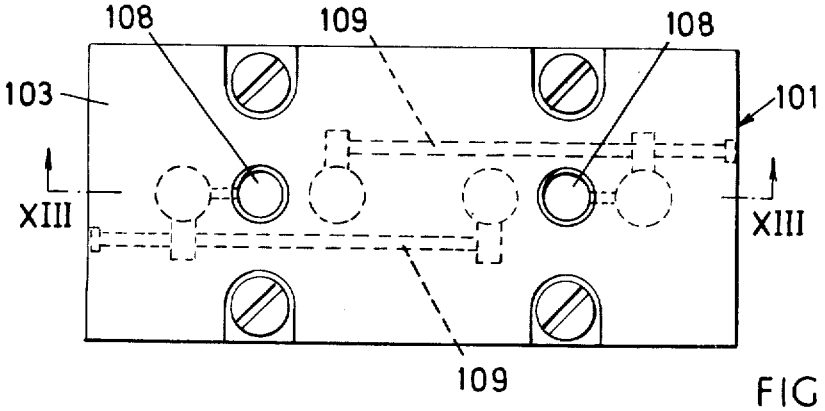
FIG. 14 is a plan view of the valve block of FIG. 13.
Figure 15:
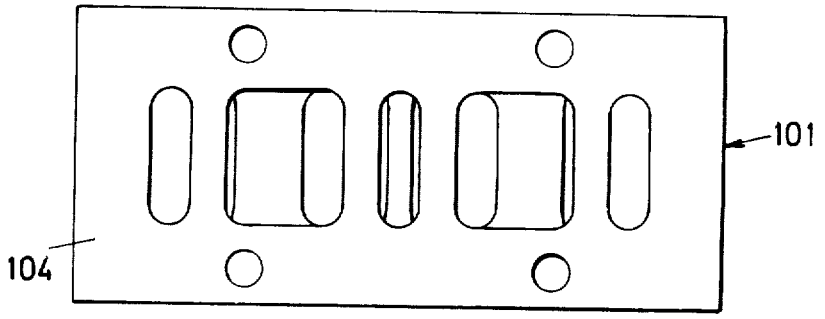
FIG. 15 is an inverse plan view of the valve block of FIG. 13.

Some of the main ports of the valve intercommunicate as can be seen in FIG. 13, and a sub-plate can be mounted on the bottom of the block (generally similar to the sub-plate of the embodiment of FIGS. 2 to 8) in order to provide four connections for the main valve combination.

I claim:

[1. A multi-way directional fluid flow control valve arrangement for the directional control of a fluid power actuator, the arrangement comprising:

a single, pressure-balanced spool-type pilot valve having at least a supply connection, an exhaust connection and two control connections and having two opposite end positions;

a housing containing at least four pilot-controlled open/shut main valves, each main valve having an inlet, an outlet, a pilot connection, a valve port and an axially movable valve member which seats on the valve port to close the valve at one end of the travel of the movable valve member, the movable valve members of all the main valves having parallel axes of movement and all main valves lying in a common plane; at least one pressure inlet for connection to a source of pressure fluid, at least one exhaust outlet and at least two working connections for connection to the fluid power actuator;

main duct means connecting the at least one pressure inlet to the inlets of a first and a second of the main valves, connecting the at least one exhaust outlet to the outlets of a third and a fourth of the main valves, and connecting the at least two working connections respectively to the outlet of the first main valve and the inlet of the third main valve and to the outlet of the second main valve and the inlet of the fourth main valve; and pilot duct means connecting said control connections of the pilot valve to respective said pilot connections of the main valves, whereby the first and fourth main valves are open and the second and third main valves are shut at one end position of the pilot valve and the first and fourth main valves are shut and the second and third main valves are open at the other end position of the pilot valve.]

[2. A control valve arrangement as claimed in claim 1, wherein the pilot valve is a "hard spool, hard sleeve" spool valve.]

[3. A multi-way directional fluid flow control valve arrangement comprising a pilot spool valve having at least a supply connection, an exhaust connection and two control connections, a valve sleeve, an axially movable spool therein and an outer sleeve fitted over the valve sleeve, the valve sleeve defining bores therethrough extending generally parallel to the axis of the valve sleeve, the valve sleeve having flow connections on at least one axial end face thereof in communication with said bores, the valve sleeve defining radial bores in communication with the first-mentioned said bores, leading to valve ports adjacent said spool, and the outer sleeve being imperforate at least adjacent the radially outer ends of said radial bores; at least four pilot-controlled open-shut main valves, each main valve having a pilot connection, a valve port and an axially movable valve member which seats on the valve port to close the valve at one end of the travel of the movable valve member, the movable valve members of all the main valves having parallel axes of movement and all main valves lying in a common plane; and duct means connecting said control connection of the pilot valve to respective said pilot connections of the main valves.]

[4. A control valve arrangement as claimed in claim 3 wherein the outer sleeve closes the radially outer ends of said radial bores.]

[5. A control valve arrangement as claimed in claim 1, wherein the pilot valve comprises a valve body and a movable valve member therein, the movable valve member having said two opposite end positions, the pilot valve moving through an intermediate position as it moves from one end position to the other end position, in which said intermediate position all said main valves are closed.]

[6. A control valve arrangement as claimed in claim 1, and comprising pilot exhaust duct means communicating said pilot valve exhaust connection with a said exhaust outlet.]

[7. A control valve arrangement as claimed in claim 1, wherein each of said main valves is a diaphragm valve comprising an axially movable diaphragm and said housing comprises at least two parts which are joined generally in a plane normal to the axes of the main valves, said arrangement further comprising a sheet of resilient material secured between said parts to provide the diaphragms of the main valves.]

[8. A control valve arrangement as claimed in claim 1, wherein each said main valve is a diaphragm valve comprising a valve chamber, a valve seat, and an axially movable valve member in the valve chamber and seatable on said valve seat, said movable valve member comprising a diaphragm, the valve chamber being substantially longer than it is wide, as seen in section normal to the axis of movement of said movable valve member, and said main valves being in line with the shorter dimensions of the valve chambers extending along the axis of said line.]

[9. A multi-way directional fluid flow control valve arrangement comprising:

a pilot spool valve having at least a supply connection, an exhaust connection and two control connections;

at least four pilot-controlled open/shut main diaphragm valves, each of said main diaphragm valves comprising a valve chamber, a pilot connection, a valve seat and an axially movable valve member in the valve chamber and seatable on said valve seat to close the valve at one end of the travel of the movable valve member; said movable valve member comprising a diaphragm and the movable valve members of all the main valves having parallel axes of movement and all main valves lying in a common plane; said valve chamber being substantially longer than it is wide, as seen in section normal to the axis of movement of said movable valve member;

wherein each said valve seat is in the form of a closed loop, the valve chamber having an inside wall of rectangular shape with semi-circular ends, as seen in section normal to the axis of movement of said movable valve member, and the spacing between the closed loop valve seat and said inside wall of the valve chamber, as soon in section normal to the axis of movement of said movable valve member, being constant all the way around the valve seat; and duct means connecting said control connections of the pilot valve to respective said pilot connections of the main valves.]

[10. A control valve arrangement as claimed in claim 1, wherein said four main valves and said pilot valve having parallel axes, the axes of said four main valves being at the corners of a square and said pilot valve having its axis at the intersection of the diagonals of said square.]

[11. A control valve arrangement as claimed in claim 1, wherein said movable valve member of each said main valve comprises a diaphragm, said arrangement defining a backing surface and said diaphragm being adjacent said backing surface when said main valve is open.]

12. A multi-way directional fluid flow control valve arrangement comprising:

a pilot spool valve having at least a supply connection, an exhaust connection and two control connections;

at least four pilot-controlled open/shut main valves, each main valve having a pilot connection, a valve port and an axially movable valve member which seats on the valve port to close the valve at one end of the travel of the movable valve member, the movable valve members of all the main valves having parallel axes of movement and all main valves lying in a common plane;

duct means connecting said control connections of the pilot valve to respective said pilot connections of the main valves;

said control valve arrangement controlling a double acting ram comprising two pressure chambers, in which arrangement said four main valves provide a supply valve and an exhaust valve for each ram chamber, and wherein said pilot valve has a midposition in which said pilot valve supply connection is in communication with said pilot valve control connections, to apply fluid pressure to all four main valves to close them, the valve arrangement comprising an inlet for connection to a supply of pressure fluid, an exhaust and a working connection for each ram chamber, and said arrangement further comprising a check valve associated with said inlet for preventing back flow of fluid out of said inlet, direct connections between each said working connection and said inlet, and respective check valves in said direct connections preventing direct flow of fluid from said inlet to said working connections.

[13. A control valve arrangement as claimed in claim 1, and further comprising an electromagnetic moving-armature actuator including means defining a space and an armature movable in said space, said pilot valve including a valve body defining a space and a movable valve member movable in said space, the former said space being sealed to the latter said space.]

[14. A control valve arrangement as claimed in claim 1, and having a single said pressure inlet, a single said exhaust outlet and two said working connections.]

[15. A control valve arrangement as claimed in claim 1, wherein in each main valve, the valve port forms the outlet of the valve, a valve seat surrounds the outlet and the inlet is outside the valve seat.]

[16. A control valve arrangement as claimed in claim 2, wherein the pilot valve comprises a radially thick sleeve defining therein a small diameter, cylindrical bore with no lands, and defining radial ducts leading into the bore and providing pilot valve ports for said pilot valve supply, exhaust and control connections.]

[17. A control valve arrangement as claimed in claim 1, wherein said housing also houses the pilot valve, wherein the pilot valve is a separable unit comprising a valve body and a valve spool therein, wherein the axis of movement of the valve spool is parallel to the axes of movements of the main valves, and wherein the pilot valve body has one axial end face sealed to said housing, all said pilot duct means passing through said end face.]

[18. A control valve arrangement as claimed in claim 1, wherein the pilot valve is a separable unit comprising a valve body and a valve spool therein, and wherein the valve body has one face sealed to said housing, all said pilot duct means passing through said one face.]

[19. A control valve arrangement as claimed in claim 18, wherein the axis of movement of the pilot valve spool is parallel to the axes of movement of the main valves, said one face of the pilot valve body being an axis end face.]

[20. A control valve arrangement as claimed in claim 7, wherein each of said housing parts is moulded in plastics material, said main duct means being moulded into at least one said part on that side of the resilient sheet which is remote from the pilot valve and respectively portions of said pilot duct means being moulded into a said part on the other side of the resilient sheet.]

[21. A control valve arrangement as claimed in claim 16, wherein an outer sleeve is fitted over said radially thick sleeve, said radially thick sleeve defines longitudinal ducts therethrough extending generally parallel to the axis of the pilot valve, said radially thick sleeve has flow connections on at least one axial end face thereof in communication with said longitudinal ducts, said radial ducts are in communication with said longitudinal ducts, and the other sleeve is imperforate at least adjacent the radially outer ends of said radial ducts.]

[22. A multi-way directional fluid flow control valve arrangement comprising:

a "hard spool, hard sleeve" pilot valve having at least a supply connection, an exhaust connection and two control connections, the pilot valve comprising a radially thick sleeve defining therein a small diameter, cylindrical bore with no lands, and defining radial ducts leading into the bore and providing pilot valve ports for said supply, exhaust and control connections;

at least four pilot-controlled open/shut main valves, each main valve having a pilot connection, a valve port and an axially movable valve member which seats on the valve port to close the valve at one end of the travel of the movable valve member, the movable valve members of all the main valves having parallel axes of movement and all main valves lying in a common plane; and duct means connecting said control connections of the pilot valve to respective said pilot connections of the main valves.]

*23. A multi-way directional fluid flow control valve assembly for the directional control of a fluid power actuator which comprises:*

*a first molded housing formed with a pilot valve cavity and with four cavities, each cavity constituting a first diaphragm valve portion, said housing having an end wall defining said diaphragm valve cavity and including a plurality of orifices formed therein, said orifices including a supply orifice, an exhaust orifice and control diaphragm valve orifice in fluid flow communication with said first diaphragm valve portion;*

*a second molded housing formed with four cavities, each cavity constituting a second diaphragm valve portion, said housing being formed with fluid supply conduit means in fluid communication with two of said second diaphragm valve portions, said housing being formed with fluid exhaust conduit means in fluid communication with the remaining two of said second diaphragm valve portions, said housing being formed with fluid control conduit means in fluid communication with said fluid supply conduit means and said fluid exhaust conduit means;*

*valve seating means positioned between said first diaphragm valve portion and said second diaphragm valve portion thereby forming a diaphragm valve;*

*a pressure balanced spool-type valve disposed in said pilot valve cavity of said first molded housing and comprised of a spool of hard metal and a sleeve of hard metal, said spool being formed with a supply conduit means, an exhaust conduit means, and a plurality of conduit means in fluid flow communication with said diaphragm valve control orifices, said conduit means being in alignment with the respective orifices formed in said end wall of said first housing; and*

*means for mounting said first housing to said second housing.*

*24. The fluid flow control valve as defined in claim 23 wherein said four cavities lie on a common plane.*

*25. The fluid flow control valve as defined in claim 24 wherein said valve seating means are mounted on a resilient sheet member disposed between said first and second housing to form a gasket.*

*26. The fluid flow control valve as defined in claim 23 wherein said housings are formed of a plastic material.*

*27. The fluid flow control valve as defined in claim 23 wherein each of said four cavities of said second molded housing is formed with a valve port whereby axial movement of said valve seating means closes said valve port.*

*28. The fluid flow control valve as defined in claim 27 wherein each of said cavities of said first molded housing is defused by a frusto-conically shaped end wall.*

*29. The fluid flow control valve as defined in claim 28 wherein a spring is positioned within each of said cavities of said first molded housing.*

*30. The fluid flow control valve as defined in claim 23 wherein said flow conduit means of said sleeve are formed with bores extending generally parallel to the axis thereof and with radially extending bores in fluid communication with said bores extending generally parallel to the axis of said spool, and further including a sleeve positioned about said spool to close said radially extending bores.*

*31. The fluid flow control valve as defined in claim 30 wherein said spool is provided with a land having a thickness approximately the same as said radially extending bores.*

*32. The fluid flow control valve as defined in claim 23 wherein said spool moves within said sleeve between two operative end positions and wherein said spool at an intermediate position between said end position closes each of said diaphragm valves.*

*33. The fluid flow control valve as defined in claim 31 wherein in one end position one of said plurality of conduit means of said spool are in fluid communication with one of said two of said second diaphragm valve portions and with one of said remaining two of said second diaphragm valve portions, and wherein in the other end position the remaining conduit means of said plurality of conduit means of said spool are in fluid communication with the other one of said two of said second diaphragm valve portions and with the remaining one of said remaining two of said second diaphragm valve portions.*

*34. The fluid flow control valve as defined in claim 23 wherein said exhaust orifice in said end wall of said first*

*injection molded housing is in fluid communication with said fluid exhaust conduit means formed in said second injection molded housing.*

*35. The fluid flow control valve as defined in claim 23 wherein each of said cavities in said second housing is formed by a cylindrically-shaped outer wall and a cylindrically-shaped inner wall, said cylindrically-shaped inner wall forming a valve chamber, said chamber being substantially longer than the width thereof.*

*36. The fluid flow control valve as defined in claim 23 wherein the axis of said spool-type valve is parallel to the axis of said diaphragm valves.*

*37. The fluid flow control valve as defined in claim 23 wherein said housings are square-shaped and said diaphragm valve portions are formed at the corners thereof.*

*38. The fluid flow control valve as defined in claim 37 wherein the axis of said spool-type valve is at the intersection of diagonals of said housings.*

*39. The fluid flow control valve as defined in claim 23 wherein said spool and sleeve are in metal-to-metal fluid sealing engagement.*

* * * * *